United States Patent [19]

Jarsen

[11] 4,130,620
[45] Dec. 19, 1978

[54] METHOD FOR MAKING VIDEO DISCS AND VIDEO DISC MOLDS

[75] Inventor: Manfred H. Jarsen, Encino, Calif.

[73] Assignee: MCA Disco-Vision, Inc., Universal City, Calif.

[21] Appl. No.: 753,184

[22] Filed: Dec. 22, 1976

Related U.S. Application Data

[62] Division of Ser. No. 406,686, Oct. 15, 1973, abandoned.

[51] Int. Cl.² .................. B29C 5/00; B29C 5/04; B29H 3/042
[52] U.S. Cl. .................. 264/225; 264/310; 264/313; 264/337
[58] Field of Search ............ 264/219, 220, 225, 106, 264/107, 337, 259, 101, 134, 135, 299, 310, 313; 425/810, DIG. 44, DIG. 124; 274/41 R, 46 R, 42 R; 358/128; 179/100.3 V

[56] References Cited

U.S. PATENT DOCUMENTS

| | | | |
|---|---|---|---|
| 1,991,009 | 2/1935 | Browne et al. | 264/225 |
| 3,190,947 | 6/1965 | Norcross | 264/216 |
| 3,840,316 | 10/1974 | Poeschl | 425/DIG. 44 |
| 3,842,194 | 10/1974 | Clemens | 274/41 R |
| 3,855,426 | 12/1974 | Bouwhuis | 274/41 R |

FOREIGN PATENT DOCUMENTS 2079725 11/1971 France ..................... 264/107

*Primary Examiner*—Willard E. Hoag
*Attorney, Agent, or Firm*—Ronald J. Clark

[57] ABSTRACT

A matrix is used to prepare a mold of an elastomeric material. A polymerizable compound is coated onto a flexible, thin substrate such as Mylar and is placed with compound side in intimate contact with the mold. The compound is cured and is bonded to the substrate. The cured combination is stripped from the mold and is given a metallic coating to improve reflectivity. A clear plastic coating may be applied to protect the metal surface.

3 Claims, 9 Drawing Figures

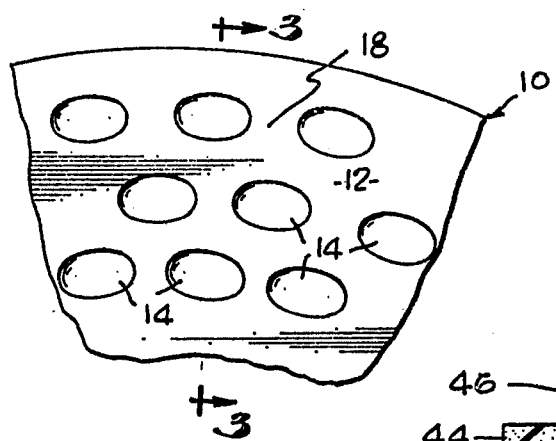
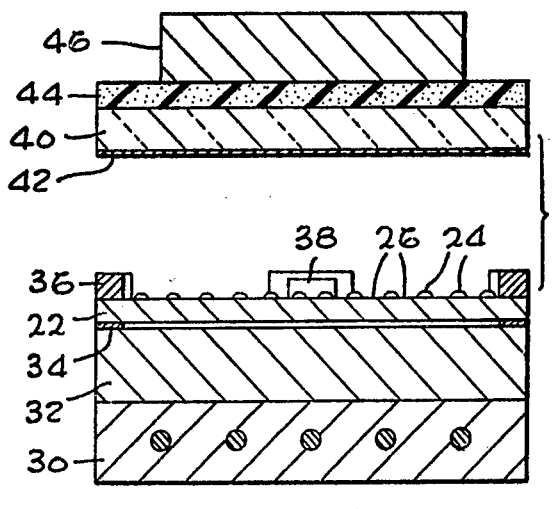
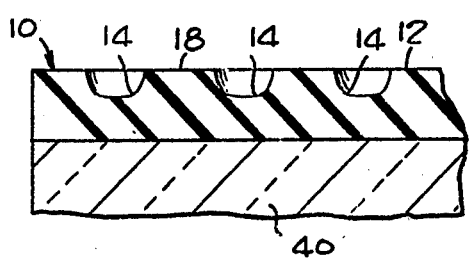
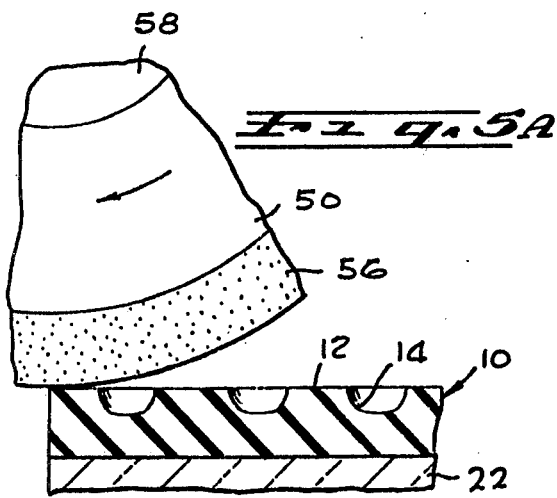
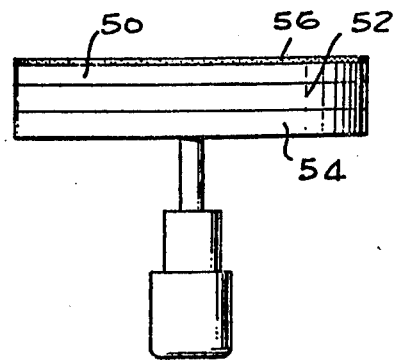

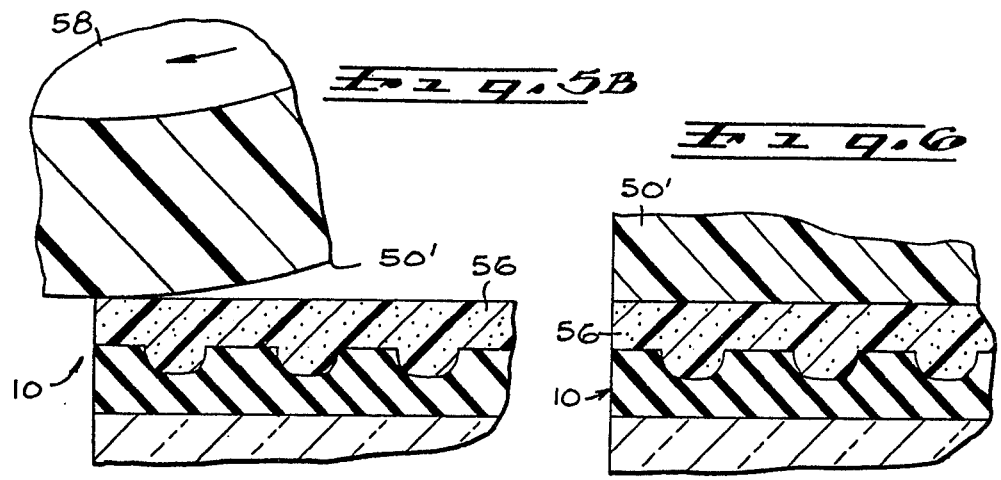
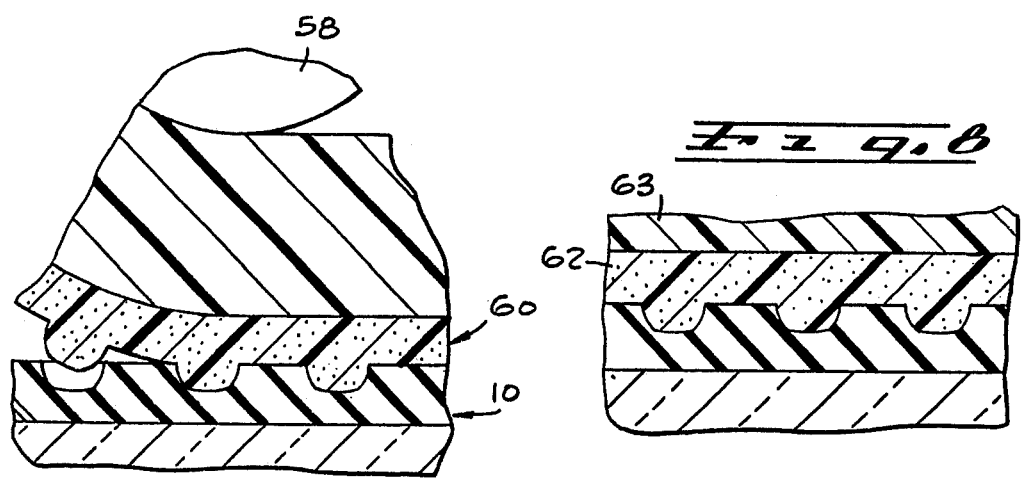
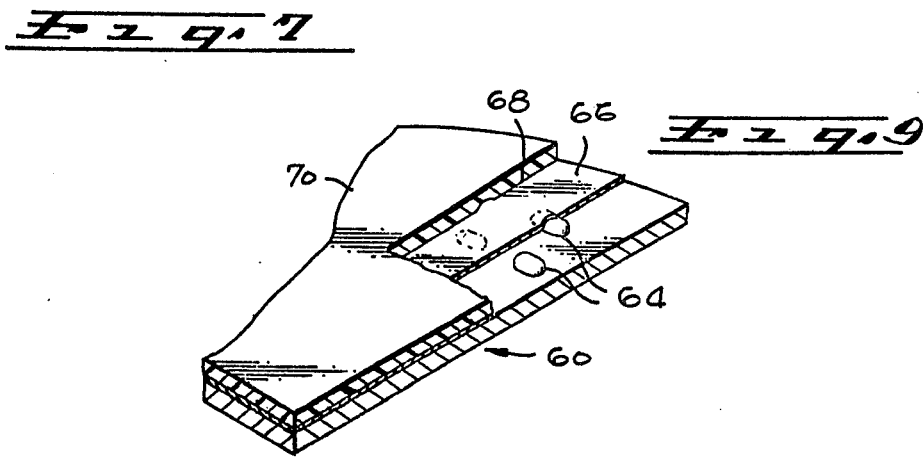

METHOD FOR MAKING VIDEO DISCS AND VIDEO DISC MOLDS

This is a division of application Ser. No. 406,686, filed Oct. 15, 1973, now abandoned.

RELATED PATENT APPLICATIONS AND PATENTS

"Articulated Mirror" by James E. Elliott, Ser. No. 333,559, filed Feb. 20, 1973 now U.S. Pat. No. 3,794,410, issued Feb. 26, 1974; "Video Disc Mastering System" by John S. Winslow, Ser. No. 333,560, filed Feb. 20, 1973 now abandoned and continued as Ser. No. 508,815, filed Sept. 29, 1974 now abandoned; "Video Disc Player" by James E. Elliott, Ser. No. 314,082, filed Dec. 11, 1972, now U.S. Pat. No. 3,914,541; "Video Disc Player" by James E. Elliott, Ser. No. 299,893, filed Oct. 24, 1972 now U.S. Pat. No. 3,829,622, issued Aug. 13, 1974; "Video Recording and Recording and Reproducing System" by Kent D. Broadbent, Ser. No. 299,892, filed Oct. 24, 1972, now U.S. Pat. No. 3,924,062; "Drop-Out Compensator" by Wayne Ray Dakin, Ser. No. 299,891, filed Oct. 24, 1972; "Video Record Disc and Process for Making Same" by David P. Gregg, Ser. No. 735,007, filed Jan. 27, 1969 now abandoned and continued as Ser. No. 571,259, filed Apr. 24, 1975 now abandoned; "Duplicating Process for Video Disc Records" by Kent D. Broadbent, U.S. Pat. No. 3,658,954, issued Apr. 25, 1972; "Video Signal Transducer Having Servo Controlled Flexible Fiber Optic Track Centering" by David P. Gregg and Keith O. Johnson, U.S. Pat. No. 3,530,258, issued Sept. 22, 1970; "Photoelectric Transducer Head" by David P. Gregg, U.S. Pat. No. 3,349,273, issued Oct. 24, 1967; "Video Disc Playback Assembly" by Keith O. Johnson, U.S. Pat. No. 3,518,442, issued June 30, 1970; "Duplicating Process for Video Disc Records" by Kent D. Broadbent, U.S. Pat. No. 3,687,664, issued Aug. 29, 1972; "Reading Head for Video Disc Player" by Manfred H. Jarsen, Ser. No. 402,635, filed Oct. 1, 1973, now U.S. Pat. No. 3,947,884; "Method of Creating a Replicating Matrix" by Manfred H. Jarsen, Ser. No. 402,636, filed Oct. 1, 1973, now abandoned; "Fluid Cushion Turntable for Video Disc Player", by Manfred H. Jarsen, Ser. No. 402,634, filed Oct. 1, 1973.

BACKGROUND OF THE INVENTION

1. Field of the Invention

The present invention relates to information handling systems and more particularly to a process for producing replicas from a master matrix and to the mold and replicas produced from the process.

2. Description of the Prior Art

Over the years, there has been a continuing attempt to achieve a low cost, mass produced disc which contains video information that can be retrieved with an inexpensive home instrument for playback for a conventional television set.

Early attempts at providing video information have generally involved the use of video tape recorders of various sorts as well as photographic techniques. Still other approaches have attempted to utilize thermoplastic records or the surface alteration of a thin metallic film.

In the co-pending application of Manfred H. Jarsen, Ser. No. 402,636, filed Oct. 1, 1973, entitled "Method of Creating a Replicating Matrix and the Matrix Created Thereby," assigned to the assignee of the present invention, methods were taught which led from a master video recording, such as in the co-pending application of John S. Winslow, Ser. No. 333,560, filed Feb. 20, 1973, now abandoned and continued as Ser. No. 508,815, filed Sept. 24, 1974 and assigned to the assignee of the present invention, to a three-dimensional matrix from which replicas can be created.

In the co-pending Jarsen application, supra, the present casting process was disclosed for producing a replica on a disc which includes a Mylar polyester film substrate and a polymer layer, into which is molded the information contained in the matrix.

According to the present invention, the casting process includes the production of a principal mold which can be used to produce submatrices which, in turn, would produce submolds. Both the molds and the submolds can be used to "cast" replicas. In the preferred embodiment of the process, a Mylar substrate of thickness from 4–10 mils is uniformly coated with a very thin (approximately 3–7 microns) layer of a polymerizable resin to which a catalyst has been added.

The resin is then brought into contact with the mold and subjected to pressure to assure that the resin fills all of the depressions and/or cavities of the mold. The resin is then permitted to cure. The bond between the Mylar substrate and the resin is perfected. After curing, the Mylar and polymerized resin are a unitary structure and, as such, can be peeled from the mold. The same mold can then be used again in the casting of subsequent replicas using substantially the same techniques.

The replica, thus cast, is then provided with a reflective, metal layer, for example, through a vapor deposition process. If desired, an outer, wear layer of clear plastic can be applied.

In the video disc systems described in the related patents and applications, one systems approach permits the use of a thin, flexible disc, such as is produced by the present method. Such a disc can be read on appropriate playback equipment as has been heretofore disclosed.

If, the exigencies of mass production are such that insufficient molds can be derived from a single matrix, it is feasible, according to the present invention, to cast a number of polymer, replicas in the first mold which can function as submatrices, as well.

An alternate replica can be made from an acrylic-polyester combination. The acrylic replicas when plated, can be distributed as such. The acrylic replicas could also be utilized as a starting element in the series of plating steps that ultimately result in a stamper for use in the alternative, stamping process of producing replicas.

In yet other, alternative casting methods, replicas can be produced by first flowing the resin-catalyst mixture into the mold. The Mylar polyester film substrate is applied later, and becomes bonded to the cured resin.

The replica is then "peeled" off the mold. In the preferred embodiment, the cast replica is then subjected to a metallizing step in which a suitably reflective metal such as aluminum is applied to the surface. Vapor deposition of aluminum has been found to be satisfactory. The reflective coating enhances the optical contrast between the deformed areas representing information and the plane areas adjacent thereto. An additional coating of a clear plastic, wear layer can be applied to protect the metal film from scratches or abrasions.

It is obvious that the present method could be modified to produce replicas in which the surface deformations are depressions rather than elevated portions, should that type of replica better lend itself to the playback equipment. Further, the requirements of the playback equipment would also determine the size and shape of the surface deformations which represent the video information.

For example, in the system being developed by the assignee, a reading technique is employed which utilizes light scattering and light reflection to generate electrical signals of different significance. In such a system, the "bumps" or "depressions" serve to scatter rather than reflect light applied from the player device. The surface between adjacent bumps or depressions, however, serves as a plane reflector, and returns substantially all of the light to the player optical system.

In the alternative schemes, phase contrast optics are employed in which case it is desirable that reflecting planes be spaced apart by $n\lambda/4$ (where $\lambda$ is the wavelength of the playback radiation and "n" is an odd integer) by employed so that light reflected from a one of the surfaces is constructively interfered with, and light from the other of the surfaces is destructively interfered with.

Given an original matrix having such characteristics, the present process is admirably suited to produce replicas utilizing the mold of the present invention, that is created from the matrix.

The novel features which are believed to be characteristic of the invention, both as to organization and method of operation, together with further objects and advantages thereof, will be better understood from the following description considered in connection with the accompanying drawings in which several of the preferred embodiments of the invention are illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a perspective view of a portion of the surface of a mold made in accordance with the present invention;

FIG. 2 is a side section view of the apparatus used to produce the mold of FIG. 1;

FIG. 3 is a side section view of the mold of FIG. 2 taken along line 3—3 in the direction of the appended arrows prior to the casting of a replica;

FIG. 4 is a side section view of apparatus for providing a polymerizable resin and substrate combination;

FIG. 5 including FIGS. 5A and 5B are side section views of the mold of FIG. 1 with a resin and substrate combination being applied in alternative processes;

FIG. 6 is a side section view of the mold during the casting step;

FIG. 7 is a side section view of the polymerized resin and substrate being removed from the mold;

FIG. 8 is a side section view of a cast acrylic replica in the mold; and

FIG. 9 is a perspective view of a portion of a replica disc partly broken away to show the metal and plastic protective coatings.

DESCRIPTION OF THE PREFERRED EMBODIMENTS

In FIG. 1, there is shown in perspective view a portion of a mold 10 made according to the process of the present invention. As will be noted, the mold 10 has an upper surface 12 in which is formed a plurality of depressions 14 generally arranged in a concentric spiral track 16.

Although the individual depressions are arranged in a generally circular pattern, the track 16 is a discontinuous one, and includes a flat surface area 18 between adjacent depressions 14. The preferred embodiment of the present invention contemplates an information track 16 arranged in a spiral, but alternative embodiments contemplate information arranged in circular tracks, not shown, as well.

It is to be further noted that while the preferred embodiment illustrated in FIG. 1 shows each track 16 to include depressions 14, it is equally feasible to supply protuberances or "bumps" in place of the depressions 14. If the surface features provided in the playback replica are intended to scatter radiation rather than reflect it, the choice of one or the other is dictated primarily by considerations of fabrication of the mold 10, or the replica to be cast in the mold 10.

The depressions and bumps are discontinuities displaced from the flat surface 18 and represent the information. Each discontinuity having a constant dimension in the radial direction and a constant maximum dimension in the direction perpendicular to the flat surface 18. The length of each discontinuity in the circumferential direction and the distance between adjacent discontinuities in the circumferential direction representing the stored information.

The process of producing the mold 10 can be explained in connection with FIG. 2. The starting material should be a matrix 20, such as is disclosed in the copending Jarsen application. As taught in that application, the matrix is a glass disc 22 on which the video information is arranged as a series of photoresist "bumps" 24 approximately 0.7 micron high and generally 1 micron in the radial direction. The bumps are generally arranged in a concentric, spiral track with a spacing of approximately 2 microns between the centers of adjacent tracks.

The length of each bump in the circumferential direction and the distance between adjacent bumps in the circumferential direction represents the stored information.

The matrix 20 may or may not have remaining on the surface, a very thin layer of a low melting point opaque material 26 such as is disclosed in the copending Winslow application. A thin bismuth film has been found to be suitable for this purpose. If desirable, the bismuth film 26 may be removed utilizing a suitable chemical solvent. Such a step is generally not undertaken in that it may jeopardize the integrity of the information pattern.

To prepare the matrix 20 for the present process, a mold release compound (not shown) is spun on to the matrix 20 and permitted to dry, after which it is baked. In one satisfactory process, a commercial release, identified as Fitzgerald Polyvinyl Alcohol Mold Release, is diluted with three parts of water to each part of mold release.

With a matrix 20 such as is disclosed by Jarsen supra, approximately 25 cc. of mold release is diluted to a total quantity of 100 cc., filtered and then applied to the matrix 20. The mold release is dried in air for approximately 10 minutes, and the matrix is then baked at a temperature of 300° F. for approximately 30 minutes.

As seen in FIG. 2, apparatus is shown which is suitable for use in the production of the mold 10. A heater unit 30 has, placed on its upper surface, a block of aluminum 32 which is a good thermal conductor. The glass-based matrix 20 is secured to the aluminum plate 32 using a wax 34 which acts as both an adhesive and a cushion.

Spacers 36 are provided to create a volume in which the mold 10 can be made. In the preferred embodiment, first spacers 36, approximately 14 mils high, are placed around the periphery of the matrix 20 and a second spacer 38 approximately 7 mils in thickness is placed at the center of the matrix disc.

A glass plate 40 is coated with a primer compound 42 to which the elastomeric material comprising the mold will adhere. One such primer material is sold under the designation Primer SS4120 by the General Electric Company. The primer coating 42 is permitted to air dry for approximately 30 minutes.

In the preferred embodiment, the mold is made of a silicone rubber elastomer, such as is sold by the General Electric Company under the designation RTV 615A silicone rubber. In the process, being described herein, it has been found that approximately 200 grams of the silicone rubber, with 20 grams of the proper catalyst for that compound, are sufficient to make a roughly 15 inch diameter mold that is approximately 14 mils thick.

The mixture of silicone rubber and catalyst is mixed for approximately 15 minutes, filtered and degassed, until all bubbles have disappeared. The compound is then poured over the surface of the matrix 20 which has been treated with the mold release. The glass plate 40 with the applied primer layer 42 is placed, primer layer down, on the spacers 36, 38 and immediately overlies the rubber-catalyst mixture.

A rubber platen 44 is then placed on the glass disc 40, and a mass 46 is placed on the platen 44 to apply a uniform pressure over the surface of the glass 40.

The rubber mixture is then cured. The temperatures and cure times are, of course, related. For lower temperatures, ranging from 160° to 200° F., a curing time of approximately 12 hours can be used. At the higher curing temperatures, shorter curing times can be used. For example, a 14 mil thick, 15 inch diameter mold will cure in approximately 2 hours at 400° F.

At the conclusion of the curing period, the upper plate 40 is separated from the matrix 20. The presence of the mold release on the matrix 20 and the primer 42 on the upper glass disc 40 causes the mold thus created to adhere to the upper disc 40 and not to the matrix 20.

The completed rubber mold 10, shown in FIG. 3, can then be trimmed to cut away the extruded excess and should be cleaned and vacuumed for use in replication. If the mold release has worked well, the original matrix may be used to produce yet additional molds. However, because the surface features on the matrix 20 are merely hardened photoresist material 24 adhering to the glass disc 22, it is not generally expected that more than a very limited number of molds can be made from the original matrix 20. A mold 10 once made, however, can be used to cast either replicas, to be used for playback, or submatrices, which may or may not be used for playback.

Turning next to FIG. 4, the process of producing a replica is partially illustrated. In a preferred embodiment, a Mylar polyester film substrate 50 is cut into a 15 inch disc and placed on a glass support plate 52. Both are then placed on a turntable 54. The substrate 50 is washed with acetone and Xylene and is spun dry.

A polyurethane resin mixture is then prepared. In the preferred embodiment, a polyurethane resin is employed which is sold by Hughson Chemical Company under the designation Chemglaze Z051. Alternatively, a similar resin, Chemglaze Z052, may also be used. A resin thinner, sold under the designation Chemglaze 9951 is also used in the preferred embodiment. The resin and thinner are generally used in a ratio of 3 parts resin to 2 parts of thinner.

A catalyst sold by the Hughson Chemical Company as Fast Catalyst 9984 or 9986 is also employed to speed the polymerization process. In the preferred embodiment, 10 cc. of catalyst is diluted to 75 cc., using the thinner, prior to use.

Approximately 5 cc. of the diluted catalyst is then mixed with 100 cc. of the diluted resin solution. The combination is mixed well for approximately 3 minutes and is then "spun" onto the substrate disc 52. With the turntable 54 operating at approximately 400 rpm, a polymer 56 coating is spun on for approximately 5 seconds, to result in an approximately 5 micron layer in the preferred embodiment. The thickness can range from 3 to 7 microns.

The methods of applying the coated substrate to the mold 10 are shown in FIG. 5. As shown in FIG. 5A, the preferred technique is to partially wrap the substrate 50 around a rather large roller 58 and then to roll the combination onto the mold 10. This method provides a gradual application of the resin coated substrate 50 and, at the same time, provides an opportunity to assure an even and uniform application of pressure to the resin layer 56, while minimizing the occurrence of trapped bubbles of air or gas in the mold 10.

While the resin layer 56 is setting up, the combination can be roller again with a heavier roller. The set-up time runs for from 15 to 45 minutes depending upon the resin-catalyst combination and the thickness of the resin layer 56.

Other materials can be used in addition to the polyurethane resin. For example, acrylics and epoxies can also be employed as well as monomers which can be polymerized by radiation such as ultraviolet light or radio frequency energy as taught in the related Broadbent patents, supra. Similarly, substrates other than Mylar polyester film could be employed, including metal foils, which can be thin and flexible.

It has also been found that an alternative casting process can be employed, as illustrated in FIG. 5B. The resin is thinned and mixed with the catalyst and applied directly to the mold 10. The substrate 50' is then rolled onto the resin layer 56' which is then permitted to cure and to adhere the substrate 50' as illustrated in FIG. 6. The finished replica will then be substantially the same, no matter which process is employed.

In FIG. 7, there is shown a method of removing a replica 60 from the mold 10. The roller 58 which was used to apply the polymer-substrate combination can be used to remove the cast and cured replica 50. One edge of the replica 60 adheres to the roller 58, which, when rotated, removes the cured replica 60 from the mold 10.

Alternatively, an acrylic material may be cast in the mold 10 as shown in FIG. 8. The acrylic replica 62 may be used with a polyester film substrate 63. The acrylic replica can be used interchangeably with the polyurethane replicas.

It has also been noted that, inasmuch as the acrylic replicas 62 can be plated, the plated acrylic replica 62 can also be utilized as an interim element in the process of producing stampers for making replicas utilizing embossing techniques.

While the methods of producing the mold and the replicas have been described in terms of a system which utilizes "bumps" to represent information, it is equally feasible to employ the same process to create a mold whose surface resembles the matrix and from which alternative replicas can be cast. In the alternative replicas, information is represented as depressions in the replica surface.

Similarly, while the present invention has been described in terms of a video disc system that employs light scattering for the recognition of information, the process steps are equally applicable to phase contrast recording and playback systems. In such systems, a mold can be created from the original master. The reflecting planes are separated by a vertical distance of $n\lambda/4$ (where $\lambda$ is the wavelength of the illuminating radiation and "n" is an odd integer) and can be easily replicated. It would seem that a relatively rigid replica would be preferable for this type of playback.

Turning finally to FIG. 9, a replica disc 60 is shown in some greater detail. The disc 60 includes, in the preferred embodiment, a surface pattern of discontinuous bumps 64 separated by planar areas 66. A reflective metal coating 68, such as aluminum, is applied by a process such as vapor deposition to enhance the reflectivity of the planar portions 66 and to enhance the light scattering capability of the individual surface deformations 64 representing information.

If desired, an additional, clear plastic coating 70 can be applied to the disc 60 to protect the metallic surface 68 from scratches, abrasion, and wear. However, with the "non-contact" playback systems, such as are disclosed in the Elliott patents, supra, as well as the vacuum playback transducer and fluid cushion turntables disclosed by Jarsen, supra, the chances of abrasive wear, at least with respect to the playback mechanism, is minimized.

Thus there has been disclosed a complete process for converting a matrix derived from a master disc into a replica disc for playback. The process includes, first, a process for creating molds from a matrix. The replicas from the first mold could be employed to make additional submolds without any loss in fidelity.

Second, a process is taught for the casting of replicas from the molds thus taught. The replicas include a surface layer which is a polymerizable compound that has been cast in the mold and a polyester substrate, which is bonded to the surface layer to give it structural integrity. Additional surface coatings of reflective metal and clear plastic are added to protect the disc from wear and abrasions.

What is claimed as new is:

1. A process for producing a video disc comprising the steps of:
   forming a master matrix including a substrate having a flat first surface carrying a video information track, and said information track being in the form of a series or photoresist members, and said members are generally arranged in a concentric, spiral track, and each member having a constant dimension in a radial direction and a constant maximum dimension in a direction perpendicular to said surface, and the length of each member in the circumferential direction and the distance between adjacent member in the circumferential direction being representative of the video information; pouring a silicone rubber compound over the surface of the master matrix to a uniform depth; applying a uniform pressure over said poured compound, heating said compound until cured while applying said uniform pressure, separating said cured elastomer from said matrix thereby forming an elastomeric mold member and casting a replica video disc from said mold member, and said replica video disc having a first surface carrying a replicated copy of said information track carried by said first surface of said substrate.

2. The process as recited in claim 1 and further including the additional steps of:
   attaching a backing member to said compound after said compound is poured into the mold and prior to the application of a uniform pressure over said poured compound; and
   using said backing member during separation of the mold from said matrix for holding said mold.

3. A process for producing a video disc comprising the steps of:
   providing a master matrix of the type employing a glass disc substrate having a first surface;
   forming a video information track on said first surface, and said information track being in the form of a series of photoresist discontinuities, and the discontinuities are generally arranged in a concentric, spiral track, and each discontinuity having a constant dimension in a radial direction and a constant maximum dimension in the direction perpendicular to said surface, and the length of each discontinuity in the circumferential direction and the distance between adjacent discontinuities in the circumferential direction being representative of the video information;
   providing a silicone rubber compound as the material for making an elastomer mold;
   mixing, filtering and degassing said silicone rubber compound for preparing said compound for use by removing all bubbles therefrom;
   pouring said prepared compound over the surface of said master matrix to a uniform depth;
   apply a uniform pressure over said poured compound;
   heating said compound until cured while being subjected to said uniform pressure;
   separating said cured elastomer mold from said matrix; and
   casting a replica video disc in said elastomeric mold for forming an information bearing surface made from a material selected from a polyurethane resin mixture, an acrylic, an epoxy and a polymerizable monomer, and for forming a surface including discontinuities made of the same material as said surface, and the discontinuities are generally arranged in a concentric, spiral track, and each discontinuity having a constant dimension in a radial direction and a constant maximum dimension in the direction perpendicular to said surface, and the length of each discontinuity in the circumferential direction and the distance between adjacent discontinuities in the circumferential direction be representative of the video information.

* * * * *